United States Patent [19]
Wang et al.

[11] Patent Number: 5,354,458
[45] Date of Patent: Oct. 11, 1994

[54] SEQUENCING BATCH LIQUID TREATMENT

[75] Inventors: Lawrence K. Wang, Latham, N.Y.; Lubomyr Kurylko, New Providence, N.J.; Mu H. S. Wang, Latham, N.Y.

[73] Assignee: International Environmental Systems, Inc., USA, Latham, N.Y.

[21] Appl. No.: 871,041

[22] Filed: Apr. 20, 1992

Related U.S. Application Data

[63] Continuation-in-part of Ser. No. 551,543, Jul. 11, 1990.

[51] Int. Cl.$^5$ .............................................. B01D 53/02
[52] U.S. Cl. ................................. 210/180; 210/188; 210/194; 210/205; 210/206; 210/218; 210/221.2; 210/208
[58] Field of Search ............... 210/205, 206, 207, 208, 210/209, 218, 219, 220, 221.1, 221.2, 180, 188, 194, 196, 197

[56] References Cited

U.S. PATENT DOCUMENTS

| | | | |
|---|---|---|---|
| 3,770,630 | 11/1973 | Kamperman | 423/140 |
| 4,009,101 | 2/1977 | Hayashi | 210/665 |
| 4,265,866 | 5/1981 | Arzoumanidis et al. | 423/304 |
| 4,332,687 | 6/1982 | Datgnault et al. | 210/724 |
| 4,380,531 | 4/1983 | Wisnouskas et al. | 423/304 |
| 4,755,296 | 7/1988 | Ying et al. | 210/631 |
| 4,789,484 | 12/1988 | Ying et al. | 423/304 |
| 4,857,198 | 8/1989 | Meidl | 210/603 |
| 4,859,216 | 8/1989 | Fritsch | 55/28 |
| 4,892,664 | 1/1990 | Miller | 210/747 |
| 4,931,175 | 6/1990 | Krofta | 210/86 |
| 5,049,320 | 9/1991 | Wang et al. | 261/122 |
| 5,064,531 | 11/1991 | Wang et al. | 210/96.1 |
| 5,068,031 | 11/1991 | Wang et al. | 210/96.1 |
| 5,069,783 | 12/1991 | Wang et al. | 210/196 |
| 5,084,165 | 1/1992 | Wang et al. | 210/196 |
| 5,122,165 | 6/1992 | Wang et al. | 55/38 |
| 5,122,166 | 6/1992 | Hyrcyk et al. | 55/38 |
| 5,167,806 | 12/1992 | Wang et al. | 210/188 |

OTHER PUBLICATIONS

Water Treatment, vol. 6, pp. 127 to 146, (1991) by L. K. Wang.
Proceedings of the 44th Industrial Waste Conference, Lewis Publishers Chelsea, Mich., vol. 44, pp. 493-504 and 655-673 (1990) by L. K. Wang et al.
The U.S. Dept. of Commerce, National Technical Information Service (NTIS) Report #PB 88-200522 (1984) by L. K. Wang.
Proceedings of the 44th Industrial Waste Conference, Lewis Publishers, Chelsea, Mich., vol. 44, pp. 141-147 (1990) by L. Benefield et al.
Proceedings of the 43rd Industrial Waste Conference, Lewis Publishers, Chelsea, Mich., vol. 43, pp. 267-274 (1989) by Murthy et al.

*Primary Examiner*—Neil McCarthy

[57] ABSTRACT

A sequencing batch apparatus being manually or automatically operated for treating a contaminated water is described. The present invention specifically relates to the apparatus comprising an inlet pipe, a batch reactor, a chemical feeder means, at least one mixing means, a coarse bubble distribution means, a fine bubble distribution means, a liquid discharge means, and sludge discharge means for required liquid treatment, and further alternatively comprising a gas moving means, a gas pipe, a flow meter, an enclosure and a gas purification means for air emission control upon demand. The present invention further relates to an apparatus system comprising means for recovering precious metal, controlling optimum pH in an acid range, reducing hexavalent chromium to trivalent chromium, controlling optimum pH in a base range, oxidizing cyanide, destroying phosphite, separating flocs, exchanging metals, adsorbing contaminants, neutralizing an effluent, and controlling gas emission. The treated effluent can be safely discharged into a receiving water. The waste sludges, ashes and spent adsorbents containing metals, PCB, and other toxic organics are safely disposed of by cementation or solidification.

2 Claims, 5 Drawing Sheets

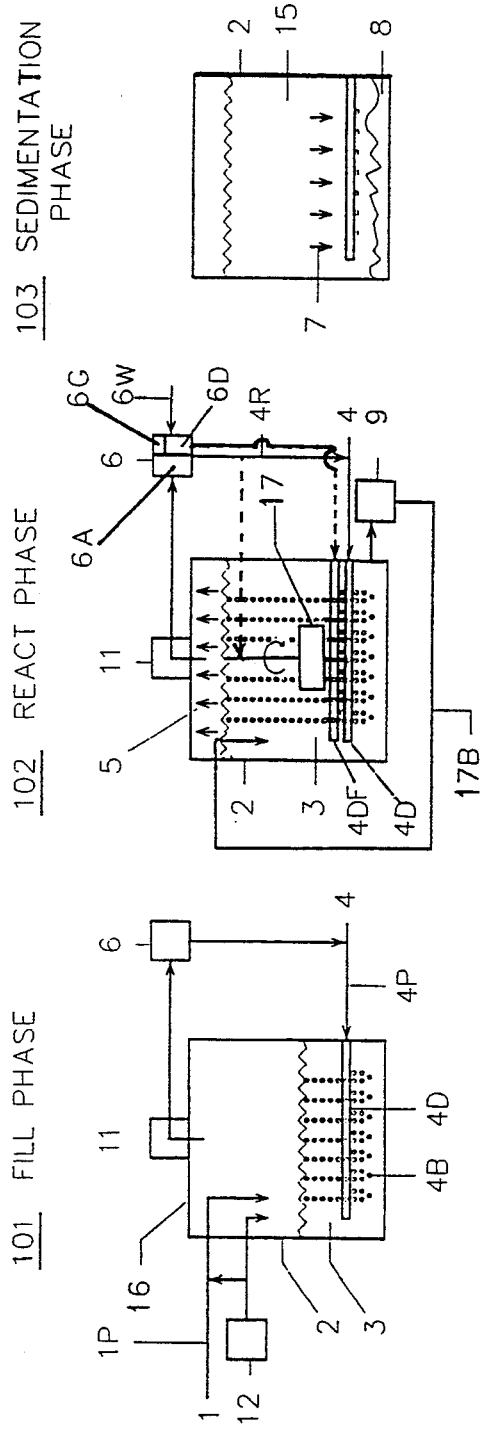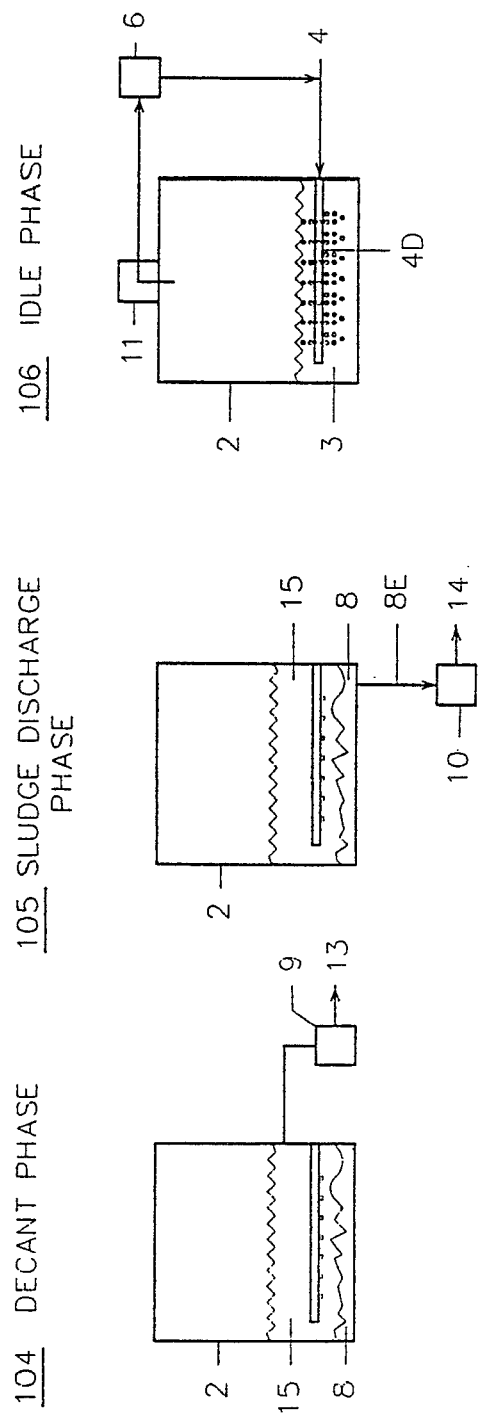
FIG. 1

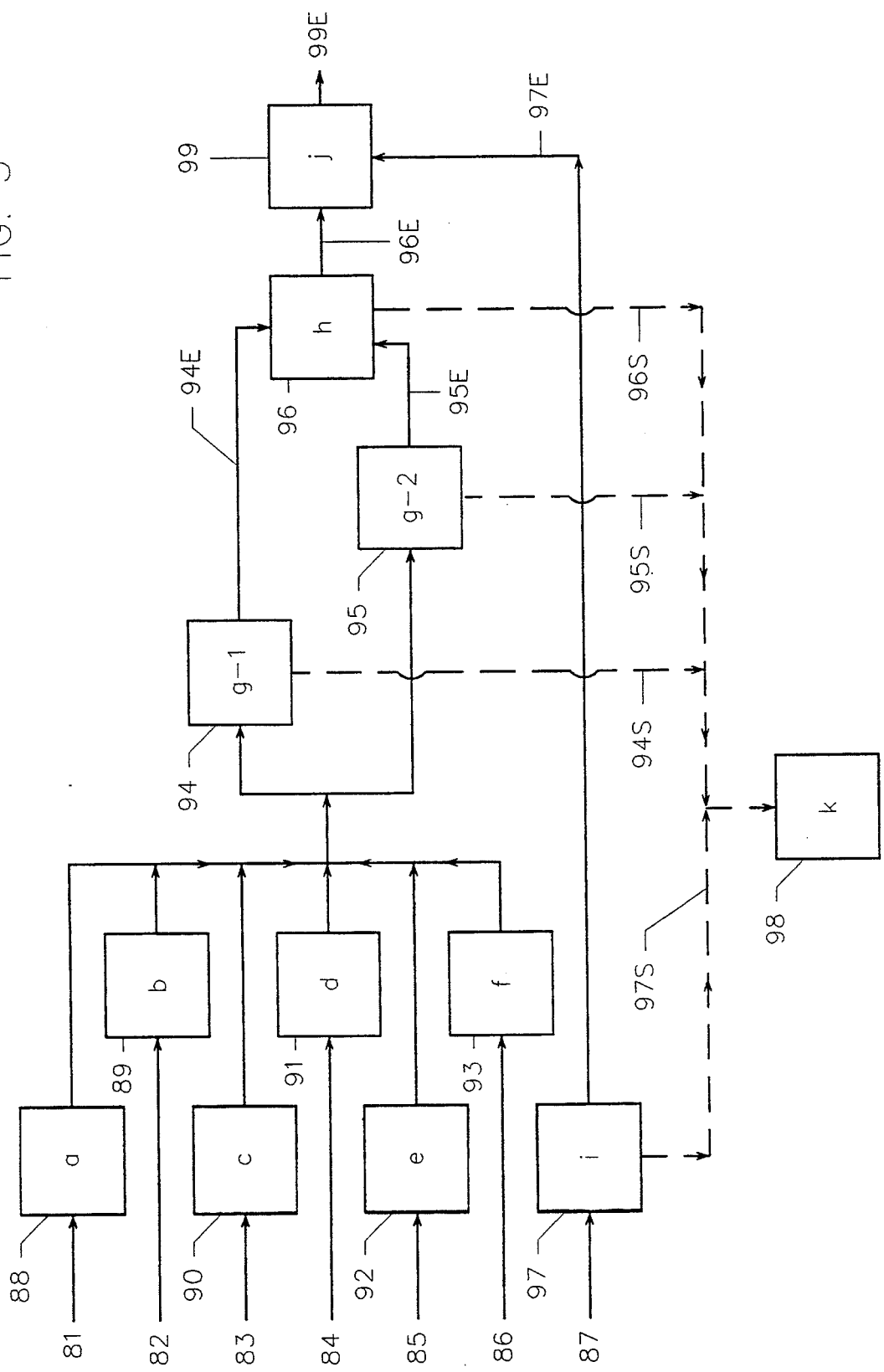

SEQUENCING BATCH LIQUID TREATMENT

This application is a continuation-in-part of the U.S. patent application Ser. No. 07/551,543, filed Jul. 11, 1990, now pending.

BACKGROUND OF THE INVENTION

1. Field of the Invention

The present invention relates to a process system and apparatus for treating spent metal finishing effluents to recover precious metals and to remove objectionable contaminants from the effluents such as hexavalent chromium, nickel, iron, copper, cadmium, lead, zinc, silver, tin, cyanide, phosphorus species, oil and grease, surfactants, toxic organics, sludges, ashes and spent adsorbents. The process system and the apparatus of this invention represent a low cost and highly efficient alternative to present technology which requires high capital investment, and off-site disposal.

The present invention also relates to an improved method and apparatus for purifying the groundwater which has been contaminated by the objectionable contaminants listed above.

Electroplating is the production of a thin surface coating of one metal upon another by electro-deposition. This surface coating is applied to provide corrosion protection, wear or erosion resistance, anti-frictional characteristics, or for decorative purposes. The electroplating of common metals includes the processes in which ferrous or nonferrous basis material is electroplated with copper, nickel, chromium, brass, bronze, zinc, tin, lead, cadmium, iron, aluminum or combinations thereof. Precious metals electroplating includes the processes in which a ferrous or nonferrous basis material is plated with gold, silver, palladium, platinum, rhodium, indium, ruthenium, iridium, osmium, or combinations thereof. In electroplating, metal ions in either acid, alkaline or neutral solutions are reduced on cathodic surfaces. The cathodic surfaces are the workpieces being plated. The metal ions in solution are usually replenished by the dissolution of metal from anodes or small pieces contained in inert wire or metal baskets. Replenishment with metal salts is also practiced, especially for chromium plating. In this case, an inert material must be selected for the anodes. All the aforementioned substances are also the contaminants in the metal finishing effluents.

Cyanide solutions are popular for copper, zinc, brass, cadmium, silver, and gold. Non-cyanide alkaline solutions containing pyrophosphate have come into use recently for zinc and copper. Cyanides and pyrophosphates are then the contaminants if the cyanide solutions and the alkaline solutions, respectively, are used.

Electroless Plating is a chemical reduction process which depends upon the catalytic reduction of a metallic ion in an aqueous solution containing a reducing agent and the subsequent deposition of metal without the use of external electrical energy.

Electroless plating provides a uniform plating thickness on all areas of the part regardless of the configuration or geometry of the part. An electroless plate on a properly prepared surface is dense and virtually non-porous. Copper and nickel electroless plating are the most common. The basic ingredients in an electroless plating solution are: (1) A source of metal, usually a salt; (2) A reducer to reduce the metal to its base state; (3) A complexing agent to hold the metal in solution so the metal will not plate out indiscriminately; and, (4) Various buffers and other chemicals designed to maintain both stability and increase bath life. The chemistry of electroless plating is best demonstrated by examining electroless nickel plating. The source of nickel is a salt such as nickel chloride, or nickel sulfate, and the reducer is sodium hypophosphite. Accordingly, the basic ingredients in the electroless plating solutions are also the potential contaminants that must be removed from the process effluents.

There are several complexing agents can be used, the most common ones being citric and glycolic acid. Nickel ions are reduced to metallic nickel. Simultaneously, a portion of the hypophosphite anions are reduced by the active hydrogen and adsorbed on the catalytic surface producing elemental phosphorus, water and hydroxyl ions. Elemental phosphorus is bonded to or dissolved in the nickel making the reaction irreversible. Both nickel and phosphorus are produced, and the actual metal deposited is a phosphorus alloy. The phosphorus content cannot be varied to produce different characteristics in the nickel plate. The complexing agents and phosphorus compounds can not be easily removed from the waste effluents by conventional wastewater treatment processes.

Anodizing is an electrolytic oxidation process which converts the surface of the metal to an insoluble oxide. These oxide coatings provide corrosion protection, decorative surfaces, a base for painting and other coating processes, and special electrical and mechanical properties. Aluminum is the most frequently anodized material, while some magnesium and limited amounts of zinc and titanium are also treated. For aluminum parts, the formation of the oxide occurs when the parts are made anodic in dilute sulfuric acid or dilute chromic acid solutions. The oxide layer begins formation at the extreme outer surface, and as the reaction proceeds, the oxide grows into the matter. Sulfuric acid or chromic acid solutions containing the base metals are the common contaminants.

Coating operation includes chromating, phosphating, metal coloring and passivating. These coatings are applied to previously deposited metal or basis material for increased corrosion protection, lubrication, preparation of the surface for additional coatings or formulation of a special surface appearance. The contaminants produced from each of the coating operations in the below correspond to the chemicals and the base metals used in the specific coating operation.

In chromating, a portion of the base metal is converted to one of the components of the protective film formed by the coating solution. This occurs by reaction with aqueous solutions containing hexavalent chromium and active organic or inorganic compounds. Chromate coatings are most frequently applied to zinc, cadmium, aluminum, magnesium, copper, brass, bronze and silver. Most of the coatings are applied by chemical immersion, although a spray or brush treatment can be used.

Changes in the solutions can impart a wide range of colors to the coatings from colorless to iridescent yellow, brass, brown, and olive drab.

Phosphate coatings are used to provide a good base for paints and other organic coatings, to condition the surfaces for cold forming operations by providing a base for drawing compounds and lubricants, and to impart corrosion resistance to the metal surface by the coating itself or by providing a suitable base for rustpreventative oils or waxes. Phosphate conversion coatings are formed by the immersion of iron, steel, or zinc plated steel in a dilute solution of phosphoric acid plus other reagents.

Metal coloring by chemical conversion methods produces a large group of decorative finishes. This operation covers only chemical methods of coloring in which the metal surface is converted into an oxide or similar metallic compound. The most common colored finishes are used on copper, steel, zinc, and cadmium. A number of colors can be developed on zinc depending on the length of immersion in the coloring solution. Silver is given a gray color by immersion in a polysulfide solution such as ammonium polysulfide.

Passivation refers to forming a protective film on metals, particularly stainless steel and copper, by immersion in an acid solution. Stainless steel is passivated in order to dissolve any embedded iron particles and to form a thin oxide film on the surface of the metal. Typical solutions for passivating stainless steel include nitric acid and nitric acid with sodium dichromate. Copper is passivated with a solution of ammonium sulfate and copper sulfate, forming a blue-green substance on the surface of the metal.

Etching and Chemical Milling are the processes used to produce specific design configurations and tolerances or surface appearances on parts (or metal-clad plastic in the case of printed circuit boards) by controlled dissolution with chemical reagents or etchants. The spent chemical reagents or etchants are the contaminants.

Cleaning involves the removal of oil, grease and dirt from the surface of the basis material using water with or without a detergent or other dispersing agent. Alkaline cleaning (both electrolytic and non-electrolytic) and acid cleaning are both included. The contaminants from cleaning operation thus include oil, grease, dirt, detergent, dispersing agents, alkaline substances, acids, etc.

Machining is the general process of removing stock from a workpiece by forcing a cutting tool through the workpiece, removing a chip of basis material, which becomes suspended insoluble contaminant in an effluent.

Barrel Finishing or tumbling is a controlled method of processing parts to remove burrs, scale, flash, and oxides as well as to improve surface finish. Parts to be finished are placed in a rotating barrel or vibrating unit with an abrasive media, water or oil, and usually some chemical compound to assist in the operation. The spent oil, chemicals, burrs, scales, oxides, etc. are the waste substances.

Sintering is the process of forming a mechanical part from a powdered metal by fusing the particles together under pressure and heat. The temperature is maintained below the melting point of the basis metal.

Laminating is the process of adhesive bonding layers of metal, plastic, or wood to form a part.

Vapor Plating is the process of decomposition of a metal or compound upon a heated surface by reduction or decomposition of a volatile compound at a temperature below the melting point of either the deposit or the basis material.

Thermal Infusion is the process of applying a fused zinc, cadmium, or other metal coating to a ferrous workpiece by imbuing the surface of the workpiece with metal powder or dust in the presence of heat.

Salt Bath Descaling is the process of removing surface oxides or scale from a workpiece by immersion of the workpiece in a molten salt bath or a hot salt solution.

Solvent Degreasing is a process for removing oils and grease from the surfaces of a workpiece by the use of organic solvents, such as aliphatic petroleum, aromatics, oxygenated hydrocarbons, and halogenated hydrocarbons.

Vacuum Metalizing is the process of coating a workpiece with metal by flash heating metal vapor in a high-vacuum chamber containing the workpiece. The vapor condenses on all exposed surfaces.

Mechanical Plating is the process of depositing metal coatings on a workpiece via the use of a tumbling barrel, metal powder, and usually glass beads for the impacting media.

Painted Circuit Board Manufacturing involves the formation of a circuit pattern of conductive metal (usually copper) on nonconductive board materials such as plastic or glass. There are five basic steps involved in the manufacture of printed circuit boards: cleaning and surface preparation, catalyst and electroless plating, pattern printing and masking, electroplating, and etching. Other metal finishing operations include: painting, paint stripping, grinding, polishing, burnishing, deformation, shearing, heating, cutting, welding, brazing, soldering, spraying, sand blasting, coating, sputtering, assembly, calibration, testing, etc., which are self-explanatory.

The major types of effluents resulting from various metal finishing operations are: chromium bearing wastewater, cyanide bearing wastewater, oily wastewater, complexed metals bearing wastewater, precious metals bearing wastewater, common metals bearing wastewater, toxic organic bearing wastewater, solid residuals, and air emissions.

2. Description of the Prior Art

Conventional wastewater treatment technologies for metal finishing wastewater treatment include the following:

conventional sedimentation to which the influent wastewater is continuously settled by gravity, and from which the clarified supernatant is continuously discharged as the treated effluent and the settled pollutants at bottom are either continuously or periodically wasted, conventional uncovered flotation to which the influent wastewater is continuously fed, in which the floatable pollutants are continuously floated by micro gas bubbles to the water surface forming scums, and from which the clarified subnatant is continuously discharged as the treated effluent and the floated scums at top as well as air emission are continuously wasted, conventional ion exchange to which the influent wastewater is continuously fed, in which the ionic pollutants are continuously removed by the fixed bed ion exchange resins, and from which the treated effluent is continuously discharged, conventional continuous biological processes, such as activated sludge, trickling filter, rotating biological contactor, septic tank, lagoon, biological fluidized bed, etc., to which the influent wastewater is continuously fed, in which the organic pollutants are continuously consumed by the microorganisms in the presence of oxygen, and from which the wastewater is discharged to a conventional sedimentation clarifier for continuous separation of the treated effluent and the microorganisms, conventional uncovered sequencing batch reactor, to which the influent wastewater is fed intermittently, in which the microorganisms initially consume the organic pollutants when the reactor is being or has been filled by batchwise operation, and subsequently settle at bottom whenever the air supply is cut off, and from which the supernatant is discharged as the treated effluent, the gas is emitted into the air environment and the settled sludge is wasted, all by batch operation, conventional oil-water separation to which the influent wastewater is continuously fed, in which the light weight oil floats to the water surface, and from which the subnatant is continuously discharged as the treated effluent and the floated oil is wasted, and many other processes, such as reverse osmosis, ultrafiltration, microfiltration, electrodialysis, diatomaceous earth filtration, glassification, vitrification, incineration, gas phase carbon adsorption, powdered carbon adsorption, sanitary landfill, deep well injection, ocean disposal, etc.

The combination of various conventional technologies is technically feasible for treatment of metal finishing effluents, but is economically unfeasible.

For instance, existing wastewater treatment methods for removing heavy metals from all metal bearing wastewaters involve chemical precipitation, conventional sedimentation, filtration, ion exchange, reverse osmosis, electrodialysis, etc. Existing treatment methods for removing toxic organics, complexing agents, detergents, oil and grease are conventional biological processes, such as activated sludge, trickling filter, rotating biological contactors, etc. All these existing methods are either inefficient or too costly. The added disadvantages of the existing treatment methods include: generation of secondary pollution (i.e. solid residuals, air emission), large land space requirement, and complication in operation.

Various wastewaters from the metal plating and finishing operations are also potential sources of pollution to groundwater. Once a groundwater source is contaminated by soluble chromium, cyanide, oil, surfactants, complexed metals, common metals, precious metals, toxic volatile organic compounds (VOCs), toxic volatile inorganic compounds (VICs), and other toxic substances, the same existing expensive wastewater treatment of the metal finishing effluents are also applied to groundwater decontamination.

Specifically, both conventional activated sludge processes and conventional uncovered sequencing batch reactor (SBR) release toxic volatile organic compounds (VOCs) into air environment, causing air pollution. Conventional coagulation/precipitation may accidentally release toxic HCN gas, sulfur dioxide gas, and fumes from its reactor under acidic conditions. All conventional processes, except conventional uncovered SBR, are continuous process units requiring separate reactors in turn, large land space. Specially trained pollution control personnel are needed for continuous process operation and monitoring.

Incineration and sanitary landfill are conventional technologies for disposal of metal bearing sludges from metal finishing operations. Incineration is energy intensive, releases toxic air emission, and produces toxic metal bearing ashes. Sanitary landfill, on the other hand, causes groundwater contamination, which is undesirable.

An efficient and cost-effective liquid treatment system for metal finishing waste streams (wastewater, air, solid residuals) and groundwater must consider the affordability, performance, precious metal recovery, waste minimization, secondary pollution elimination, and simplicity in operation. The present invention accomplishes all these objectives.

The primary objective of this invention is to disclose the improved batch processes (instead of conventional continuous processes) for treatment of metal finishing effluents. Using batch process, new or used metal finishing tanks can also be used as the wastewater treatment tanks, for space saving, cost saving, and ease of operation. The batch processes and an improved apparatus disclosed in this invention include:

(1) the enclosed sequencing batch reactor (SBR) which with an enclosure and gas emission control means involves separate batch process steps in the sequence of filling wastewater, reacting with microorganisms, settling microorganisms and suspended solids, decanting the treated effluent, and wasting settled biological sludges in an enclosed reactor for wastewater treatment as well as for air emission control, (2) the sequencing batch sedimentation (SBS) which with or without an enclosure and gas emission control means involves separate batch process steps in the sequence of filling wastewater, reacting with chemicals and other substances, settling insoluble flocs and biomass, decanting treated effluent and wasting settled sludges and other substances, for simplified but improved wastewater or groundwater clarification, (3) the sequencing batch flotation (SBF) which with or without an enclosure and gas emission control means involves separate batch process steps in the sequence of filling wastewater, reacting with chemicals and other substances, floating lightweight insoluble flocs and biomass, discharging treated effluent, and wasting floated insoluble scums, for simplified but improved wastewater or groundwater clarification, and (4) the sequencing batch exchanger (SBE) which with an enclosure and gas emission control means involves separate batch process steps in the sequence of filling wastewater, reacting with ferrous sulfide sludge and other exchangers, settling the sludge and exchangers, decanting the treated effluent and wasting the spent ferrous sulfide and exchanger.

Still another objective of this invention is to disclose a complete metal finishing waste treatment system for recovering precious metals by immersion technology, reducing hexavalent chromium with precise pH control and reducing agent, precipitating trivalent chromium with base at precise pH range, oxidizing sulfite, phosphite and cyanide with oxidant, removing complexing agents by chemical precipitation and adsorption, removing detergent, oil and grease with a chemical pair, removing toxic organics by an enclosed sequencing batch reactor with air emission control, clarifying the pretreated effluent by sequencing batch sedimentation or sequencing batch flotation, polishing the clarified effluent by sequencing batch exchanger, buffering/neutralizing the final effluent by a neutralization filter, and stabilizing all solid residuals by cementation or polymer solidification.

The theory and principles of the present invention are described in the section entitled "Description of the Preferred Embodiments".

A comparison between the state-of-the-art and the present invention is presented below.

The U.S. Department of Commerce, National Technical Information Service (NTIS) Report #PB 88-200,522, which was written by Lawrence K. Wang in 1984, discloses a design of continuous flotation-filtration wastewater treatment systems for a nickel and chromium plating plant. The present invention relates to a sequencing batch process and apparatus for groundwater decontamination as well as treatment of various metal plating and finishing effluents, including but not being limited to nickel and chromium plating effluents.

Proceedings of the 44th Industrial Waste Conference (p. 141–147) which is written by Larry Bonefield et al in 1990 discloses the effect of pentachlorophenol on enhanced biological phosphorus removal in conventional open-top SBR systems without enclosures. Proceedings of the 43rd Industrial Waste Conference (p. 267–274) which is written by D. V. S. Murphy et al in 1989 discloses the principles of organism selection for the degradation of glyphosate in a conventional open-top sequencing batch reactor without enclosure. The present invention adopts the enclosed sequencing batch reactor for both biological liquid treatment, physical-chemical liquid treatment and air pollution control.

Water Treatment (Volume 6, p. 127–146) written by Lawrence K. Wang in 1991 discloses the state-of-the-art continuous flotation clarifier installed in Massachusetts, U.S.A. Proceedings of the 44th Industrial Waste Conference (p. 493–504) written by Lawrence K. Wang et al in 1990 discloses the theory and principles of the state-of-the-art continuous air flotation clarification process. Proceedings of the 44th Industrial Waste Conference (p. 655–673) also written by Lawrence K. Wang et al in 1990 discloses the application of conventional continuous oil-water separation, continuous flotation clarification and conventional granular carbon adsorption. The present invention relates to the enclosed sequencing batch reactor for batch flotation clarification and batch oil-water separation.

Other conventional processes and apparatuses for wastewater treatment, groundwater decontamination, and air pollution control are described in the U.S. Pat. No. 4,789,484 to Ying et al, U.S. Pat. No. 4,859,216 to Fritsch, U.S. Pat. No. 4,892,664 to Miller, U.S. Pat. No. 4,857,198 to Meidl, and U.S. Pat. Nos. 5,049,320, 5,064,531, 5,068,031, 5,069,783, and 5,084,165 to Wang et al.

None of the aforementioned processes and apparatuses relate to the enclosed sequencing batch processes and apparatuses with built-in air pollution control capability.

SUMMARY OF THE INVENTION

In accordance with the present invention, an improved method for removing hexavalent chromium, complexed metals, precious metals, common metals, cyanide, surfactants, toxic organics, oil and grease, solid residues, and air emission from various metal finishing effluents comprises the following steps:

(a) recovering precious metals in the precious metals wastewater by immersing iron in said precious metals wastewater, (b) reducing hexavalent chromium in the chromium bearing wastewater to trivalent at about pH 2.5 with sodium hydrogen sulfite or equivalent, (c) precipitating trivalent chromium, common metals, and phosphite with lime or other base at about pH 9.0–9.5, (d) oxidizing sulfite, phosphite and cyanide in cyanide bearing wastewater at pH 9.0–9.5 with an oxidant, (e) removing the complexing agents from the complexed metals wastewater with precipitating agents and adsorbents, (f) removing detergent, oil and grease from the oily wastewater with emulsion breaking agent and a pair of chemicals, (g) clarifying the combined waste above by sequencing batch sedimentation (SBS) or sequencing batch flotation (SBF), (h) final polishing the combined effluent above by adsorption with peat or sequencing batch exchanger (SBE), (i) removing toxic organics by an enclosed biological sequencing batch reactor (SBR) with air recirculation and air adsorption, (j) buffering/neutralizing each effluent or combined effluent by a neutralization filter, and (k) stabilizing all metal bearing sludges, spent adsorbents, ashes, and PCB residuals with cement or polymer solidifying agent.

In accordance with the present invention, an improved method and apparatus for treating a contaminated liquid using the Sequencing Batch Sedimentation (SBS) procedures comprises the following facilities and steps in sequence:

(a) selecting a Fill Phase which is composed of either Static Fill, or React Fill, (b) introducing said contaminated liquid to a reactor under a laminar, non-mixed environment until the reactor is totally filled, if Static Fill is chosen, (c) introducing said contaminated liquid to said reactor with chemical feeders on under turbulent environment until the reactor is totally filled, if React Fill is chosen, (d) stopping Fill Phase and starting React Phase to treat the contaminated liquid with chemicals, (e) stopping React Phase and starting Sedimentation Phase using gravity force for settling settleable and suspended solids with sufficient settling detention time, and without turbulence, (f) stopping Sedimentation Phase and starting Decant Phase for discharge of sedimentation clarified effluent (supernatant) above the reactor bottom, without disturbing the settled sludges, (g) stopping Decant Phase, and starting Sludge Discharge Phase for removal of settled sludges at the reactor bottom, (h) entering Idle Phase when there is more than one reactor or no more treatment is needed, to allow the reactor to remain idle until the reactor is ready for another cycle, and (i) repeating another cycle for liquid treatment.

Still another improved method and apparatus for treating a contaminated liquid using the Sequencing Batch Flotation (SBF) procedures comprises the following facilities and steps in sequence:

(a) selecting a Fill Phase which is composed of either Static Fill, or React Fill, (b) introducing said contaminated liquid to a reactor under a laminar, non-gas bubbled environment until the reactor is totally filled, if Static Fill is chosen, (c) introducing said contaminated liquid to said reactor with chemical feeders on, under turbulent environment, until the reactor is totally filled, if React Fill is chosen, (d) stopping Fill Phase and starting React Phase to treat the contaminated liquid with chemicals, (e) stopping React Phase and starting Flotation Phase using fine gas bubbles with diameters less than 80 microns for floating suspended, oily, surface-active and volatile contaminants, with sufficient floating detention time, (f) stopping Flotation Phase and starting Decant Phase for discharge of flotation clarified effluent (subnatant) near but above reactor bottom, without disturbing the floated scums on the top, (g) stopping Decant Phase and starting Sludge Discharge Phase for removal of floated scums in the reactor, as well as settleable matters at the reactor bottom, (h) entering Idle Phase when there is more than one reactor or more treatment is needed, to allow the reactor to remain idle until the reactor is ready for another cycle, and (i) repeating another cycle for liquid treatment.

Still another improved method and apparatus for treating the contaminated liquid using the Sequencing Batch Exchanger (SBE) comprises the following facilities and steps in sequence:

(a) introducing said contaminated liquid to a reactor containing reusable or freshly prepared exchanger in a Fill Phase, (b) stopping Fill Phase and starting React Phase to treat the contaminated liquid by exchanging soluble metal ions in said contaminated liquid with iron in insoluble exchanger under a mixing, turbulent environment, (c) stopping React Phase and starting Separation Phase using gravity force for settling reusable exchanger sludges and other spent exchanger sludges, without turbulence, (d) stopping Separation Phase and starting Decant Phase for discharge of exchanger purified effluent (supernatant) well above the reactor bottom, without disturbing the settled sludges, (e) deciding next phase based on the reactor's effluent quality or predetermined process operational hours, (f) if exchanger sludges are spent, not reusable, and must be discarded, stopping Decant Phase, and entering New Exchanger Phase for removal of all settled spent sludges at the reactor bottom, and addition of freshly prepared exchanger, (g) if exchanger sludges are not totally spent, and still reusable, stopping Decant Phase, and entering Idle Phase when there is more than one reactor or no more treatment is needed, to allow the reactor to remain idle until the reactor is ready for another cycle, and (h) repeating another cycle for liquid treatment.

Still another improved method and apparatus for treating a contaminated liquid using the enclosed, Sequencing Batch Reactor (SBR) comprises the following facilities and steps in sequence:

(a) starting a Fill Phase by introducing said contaminated liquid to an enclosed reactor and mixing the contaminated liquid with the pre-seeded mixed liquor containing microorganisms, with or without powdered activated carbon (PAC), in the presence of soluble gas required by the microorganisms, (b) stopping Fill Phase and starting React Phase by thoroughly bubbling the mixed contaminated liquid in said enclosed reactor for gas stripping of volatile organic compounds (VOC) and biological reduction of all organics from liquid phase, and by collecting & recycling the emitted gas stream from the enclosed reactor for gas purification and emission control, (c) stopping React Phase, and starting Sedimentation Phase under no inflow, no mixing, and no bubbling environment for one hour, to settle the microorganisms (activated sludge) and PAC if present, (d) Stopping Sedimentation Phase, and starting Decant Phase for discharge of the treated supernatant without disturbing the settled sludge blanket, (e) stopping Decant Phase and starting Sludge Discharge Phase for discharge of the excessive amount of microorganisms (activated sludge) and spent PAC, (f) entering Idle Phase in the presence of said soluble gas required by the microorganisms, when there is more than one reactor or no more treatment is needed, to allow the reactor to remain idle until the reactor is ready for another cycle, and (g) repeating another cycle for liquid treatment.

Also in accordance with the present invention, an improved apparatus for liquid treatment (including metal finishing effluent treatment and groundwater decontamination) and gas purification and emission control comprises the following:

(a) an inlet pipe leading a contaminated liquid to a reactor of said apparatus, (b) said reactor having the side walls, the top enclosure and the bottom thereof as an outside wall of said apparatus, (c) a chemical feeder means connected to said inlet pipe and said reactor for feeding chemicals, microorganisms, exchangers, or powdered activated carbon (PAC) slurry to said contaminated liquid, (d) mixing means inside and/or connected to said reactor for mixing the contaminated liquid with chemicals, microorganisms, PACs, or exchangers during reaction, (e) coarse bubbles distribution means inside as well as connected to said reactor for generating coarse gas bubbles (with diameter greater than 80 microns) for biological liquid treatment in the presence of microorganisms and required soluble gas, and for physical gas stripping of volatile organic compounds (VOCs) and volatile inorganic compounds (VICs) from said contaminated liquid inside said reactor, (f) fine bubbles distribution means inside as well as connected to said reactor for generating extremely fine gas bubbles (with diameter smaller than 80 microns) for dissolved gas flotation of suspended substances (including microorganisms, chemical flocs, oil, particulates, etc.) to the liquid surface inside said reactor, (g) gas moving means with gas pipe and flow meter, connected to the top enclosure of said reactor for measuring, collecting, and moving the emitted gas stream from the top of said reactor to a gas purification means, then to the bottom of said reactor, completing a cycle, (h) said gas purification means with built-in gas compressing and gas dissolving capability, connected to said gas moving means for purifying the emitted gas stream, and preparing the gas stream for recirculation to said reactor, (i) liquid discharge means connected to said reactor for discharging the treated reactor effluent, and (j) sludge discharge means connected to said reactor for discharging the sludges, spent exchangers, etc. from said reactor.

BRIEF DESCRIPTION OF THE DRAWINGS

The present invention will become more fully understood from the detailed description given herein below and the accompanying drawings, which are given by way of illustration, and thus are not limitative of a present invention, and wherein:

FIG. 1 presents the flow diagrams of Sequencing Batch Reactor (SBR) operational mode which comprises the following steps in sequence: Fill Phase, React Phase, Sedimentation Phase, Decant Phase, Sludge Discharge Phase and Idle Phase, according to the present invention;

FIG. 5 show the overall flow diagram of an improved operational mode for treatment of the precious metals bearing wastewater, the chromium bearing wastewater, the common metal bearing wastewater, the cyanide bearing wastewater, the complexed metals bearing wastewater, the oily wastewater, the toxic organics bearing wastewater and the solid wastes from various metal finishing operations, using SBR, SBS, SBF, SBE and other supplemental unit processes, according to the present invention.

DESCRIPTION OF THE PREFERRED EMBODIMENTS

Figure 2:
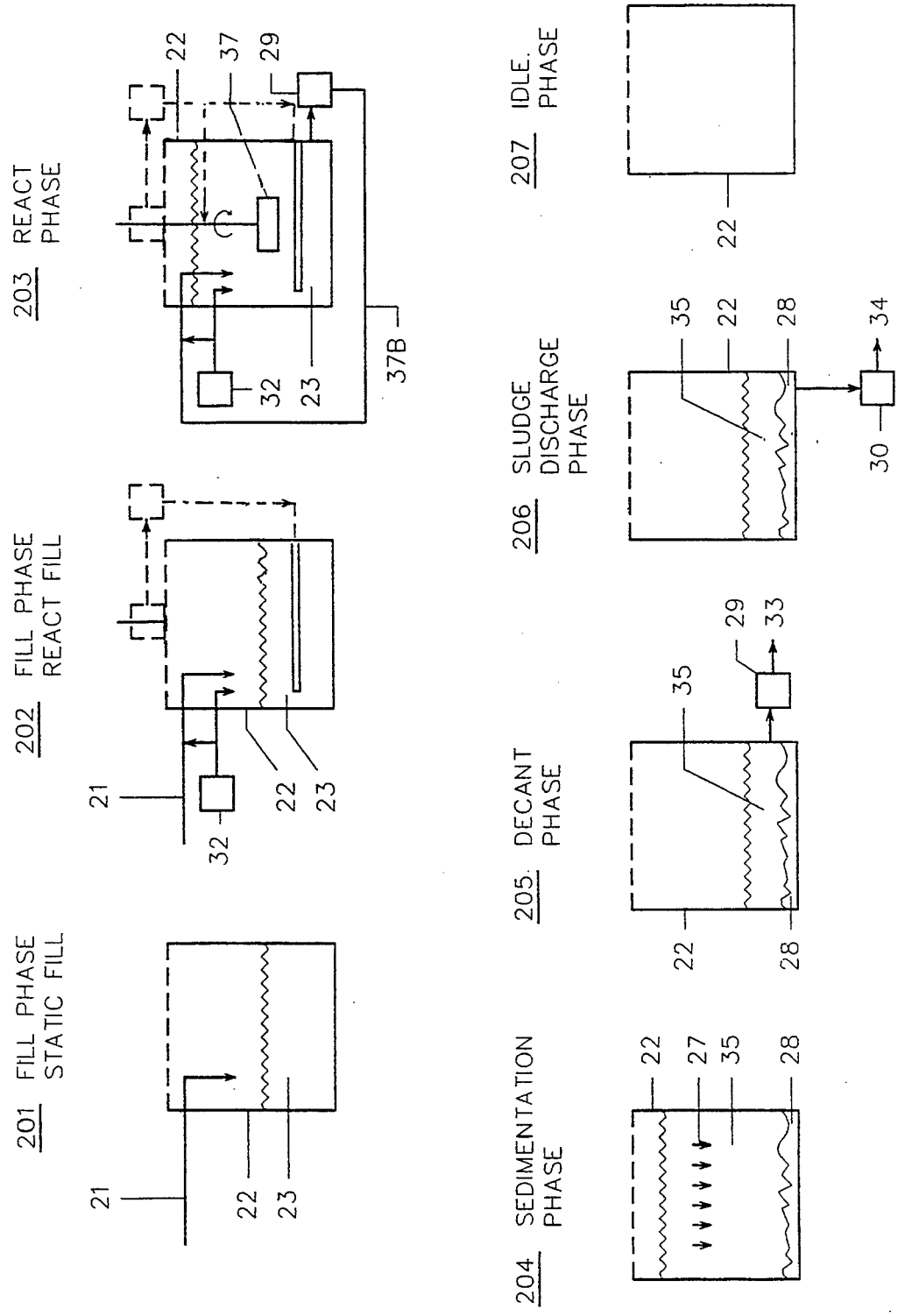
FIG. 2 presents the flow diagrams of Sequencing Batch Sedimentation (SBS) operational mode which comprises the following steps in sequence: Fill Phase (Static Fill or React Fill), React Phase, Sedimentation Phase, Decant Phase, sludge Discharge Phase and Idle Phase in accordance with the present invention.

The metal finishing effluents which are treated according to the process system of this invention contain a variety of chemicals used in the metal finishing processes as well as the metals released from the base metal parts, such as precious metals (gold, silver, palladium, platinum, rhodium, indium, ruthenium, iridium, osmium), hexavalent chromium, common metals (copper, nickel, trivalent chromium, zinc, tin, lead, cadmium, iron, mercury, aluminum), cyanide, acids, bases, toxic organic solvents (kerosene, naphtha, benzene, toluene, ketones, alcohol, glycol, ether, 1,1,1-trichloroethane, trichloroethylene, methylene chloride), oil and greases, surfactants, complexing agents (citric acid, glycolic acid, ammonia, EDTA, DNS, PDS, BAL, HEDTA, NTA, TEA, TTA, SSA, PEI, etc.), buffering agents electrolytes, paints and phosphorus species (phosphite, phosphate), solid residuals and air emissions.

The presence of this wide variety of contaminants in the metal finishing waste streams, as well as the variability of metal finishing operations from one plant to another, further complicates the waste treatment. The U.S. Environmental Protection Agency Pretreatment Standards of Existing Sources (PSES) and Pretreatment Standards for New Sources (PSNS) all in mg/l in wastewater are as follows:

| Pollutant | PSES Daily Max. | PSES Mo. Ave. Max. | PSNS Daily Max. | PSNS Mo. Ave. Max. |
| --- | --- | --- | --- | --- |
| Cadmium | 0.69 | 0.26 | 0.11 | 0.07 |
| Chromium-T | 2.77 | 1.71 | 2.77 | 1.71 |
| Copper | 3.38 | 2.07 | 3.38 | 2.07 |
| Lead | 0.69 | 0.43 | 0.69 | 0.43 |
| Nickel | 3.98 | 2.38 | 3.98 | 2.38 |
| Silver | 0.43 | 0.24 | 0.43 | 0.24 |
| Zinc | 2.61 | 1.48 | 2.61 | 1.48 |
| Cyanide-T | 1.20 | 0.65 | 1.20 | 0.65 |
| Toxic Organics | 2.13 | — | 2.13 | — |
| Cyanide-Amenable to Chlorination | 0.86 | 0.32 | 0.86 | 0.32 |

Achieving these stringent liquid effluent limitations by existing treatment technology is possible but economically unfeasible.

The major types of metal finishing waste streams include: hexavalent chromium bearing wastewater which contains soluble hexavalent chromium ions; cyanide bearing wastewater which contains cyanide ions; common metal bearing wastewater which contains soluble trivalent chromium, cadmium, lead, copper, zinc, tin, nickel, mercury, and silver ions;, complexed metal bearing wastewater which contains complexing agents and soluble metals; precious metals bearing wastewater which contains soluble precious metal; toxic organics bearing wastewater which contains toxic organic; oily wastewater which contains oil; solid residuals and air emissions. In this invention, each major type of wastewater is pre-treated separately. All pre-treated wastewater except toxic organics bearing wastewater are then subject to clarification and final polishing. The toxic organic bearing wastewater is treated by an enclosed sequencing biological reactor (SBR) of this invention with air recirculation and air purification.

The enclosed SBR is a batch process reactor with an enclosure. Specifically, the enclosed SBR involves separate batch wastewater treatment process steps in the sequence of filling wastewater to the batch reactor, reacting with microorganisms and others in said reactor, decanting the treated effluent from said reactor, and wasting settled sludges from said reactor. The waste gas emitted from said reactor is collected by the enclosure, purified, and recycled for further wastewater treatment in said reactor.

All metal bearing sludges, ashes and spent adsorbents are solidified and stabilized with cement or polymer solidifying agent.

Cementation is a common engineering practice for preparation of reinforced concrete, but is an innovative process for solidification of toxic metal bearing sludges. In practice, the cement, sand and concentrated liquid sludge are mixed together forming slurry. After a few days, depending on the type of metal bearing sludges to be solidified, the slurry becomes hardened and solidified forming a brick or block which is environmentally harmless and can be used as construction material, or simply buried. Polymer solidification is another innovative process similar to cementation, except that polymeric solidifying agent is used instead of cement in final disposal of metal bearing sludges.

The precious metal bearing wastewater is contacted with iron in an iron immersion process unit of this invention in which the precious metals that are below iron in the electromotive series of elements are deposited from wastewater while the more active iron (higher in the series) is dissolved. The iron is selected from a group comprising iron plates, iron coils, iron grits, iron bars, iron chips, iron wools, or combinations thereof. Alternatively, the precious metals bearing wastewater can be recovered by microwave process unit or electrolytic process unit.

As a typical example of said iron immersion process, the precious metals wastewater containing high concentration of colorless soluble silver nitrate is contacted with iron wools by immersion in a batch reactor. After 30 minutes, all soluble colorless silver is converted into black insoluble silver precipitates staying at the reactor bottom, and a portion of insoluble iron wool, however, becomes soluble in the form of iron nitrate staying in the solution within said reactor.

The theory of microwave process is similar to that of a microwave oven used at home. In the presence of microwave, the heat is generated for evaporation of the water in said precious metals bearing wastewater containing soluble silver nitrate. After all water is evaporated, the precious metal, silver in this case, is recovered in the form of dry crystal silver nitrate.

The electrolytic process unit is an electrochemical process, in which there are an anode and a cathode. In the presence of electric current, the soluble positively charged silver ions in said precious metals bearing wastewater containing silver nitrate move to cathode forming element silver which is suitable for recovery.

The hexavalent chromium bearing wastewater is treated with a reducing agent, at about pH 2.5 in the presence of acid, for conversion of all hexavalent chromium ions to trivalent chromium ions. The effective reducing agent is sodium hydrogen sulfite, sodium bisulfite, sodium thiosulfate, sulfur dioxide, or combinations thereof.

The soluble trivalent chromium, cadmium, copper, lead, nickel, silver, zinc, mercury, other common metals, and phosphite in the hexavalent chromium bearing wastewater and the common metals bearing wastewater are converted into insoluble forms by addition of calcium hydroxide, calcium oxide, magnesium hydroxide, sodium aluminate, sodium hydroxide, potassium hydroxide, or combinations thereof when pH is raised to about 9.0–9.5. The heavy metals and phosphite are removed from the wastewater in the forms of insoluble metal hydroxides and calcium hydrogen phosphite, respectively, known as chemical flocs.

The following are the chemical reactions:

At pH = 2.5 sodium hydrogen sulfite + 2 sulfuric acid + 2 chromate acid = chromium sulfate $Cr_2(SO_4)_3$ + 5 water + sodium sulfate + sodium hydrogen sulfate where hexavalent chromium in chromate acid $H_2CrO_4$ is converted to trivalent chromium as $Cr_2(SO_4)_3$.

At pH = 9.0–9.5 soluble trivalent chromium $Cr^{+3}$ + 3 hydroxide ions = insoluble chromium hydroxide
soluble divalent cadmium $Cd^{+2}$ + 2 hydroxide ions = insoluble cadmium hydroxide
soluble divalent copper + 2 hydroxide ions = insoluble copper hydroxide
soluble divalent lead + 2 hydroxide ions = insoluble lead hydroxide
soluble divalent nickel + 2 hydroxide ions = insoluble nickel hydroxide
soluble monovalent silver + hydroxide ion = insoluble silver hydroxide
soluble divalent zinc + 2 hydroxide ions = insoluble zinc hydroxide
soluble phosphite + calcium hydroxide = insoluble calcium hydrogen phosphite The cyanide bearing wastewater as well as any wastewater containing sulfite, hydrophosphite and phosphite are oxidized with an oxidant such as sodium hypochlorite, chlorine, potassium permanganate, hydrogen peroxide, UV-peroxide, or ozone, at pH 9.5 to 10.0. In the presence of calcium ions, a major portion of sulfite, hydrophosphite and phosphite are converted to sulfate and phosphate, respectively, and removed from wastewater by subsequent clarification. Cyanide is converted to cyanate at pH 9.5–10.0 by oxidation, and further converted to harmless carbon dioxide and nitrogen gases by a second stage oxidation (such as chlorination) at pH 8.0.

The following are the chemical reactions for treatment of the cyanide bearing wastewater:

At pH 9.5 to 10.0
soluble calcium sulfite + oxidizing agent = calcium sulfate (low solubility)
soluble calcium hydrophosphite + oxidizing agent = insoluble calcium phosphate
soluble calcium phosphite + oxidizing agent = insoluble calcium phosphate
cyanide + oxidizing agent = cyanate
At pH = 8.0
Cyanate + oxidizing agent = carbon dioxide gas + nitrogen gas where oxidizing agent is hypochlorite, chlorine, permanganate, ozone or combinations thereof.

The complexed metals wastewater containing complexing agents and soluble metal bearing is treated with a precipitating agent which is selected from a group comprising calcium hydroxide, calcium oxide, sodium aluminate, or combinations thereof depending on the type of complexing agent used, for precipitation of all soluble metals in insoluble metal hydroxide forms at about pH 9.0–9.5. The pretreated complexed metals wastewater is subject to subsequent clarification and adsorption polishing. The adsorption polishing of said complexed metal bearing wastewater is accomplished using adsorbent, such as peat, powdered activated carbon, granular activated carbon, polymeric resin or combinations thereof. It is observed that at pH 9.0–9.5, residual soluble copper and nickel are below 0.1 mg/l, and residual soluble zinc and lead are below 1 mg/l and 10 mg/l, respectively.

The oily wastewater is treated by emulsion breaking and coagulation with a pair of chemicals, such as alum and sodium aluminate at pH about 6.5. Other pairs of chemicals of this invention include alum-lime, alum-potassium hydroxide, alum-sodium hydroxide, ferric chloride-sodium aluminate, ferric sulfate-sodium hydroxide, alum-magnesium hydroxide, ferric chloride-magnesium hydroxide, ferric sulfate-magnesium hydroxide, polyaluminum chloride-magnesium hydroxide, polyaluminum chloride-sodium aluminate, polyaluminum chloride-sodium hydroxide, and ferric chloride-sodium hydroxide. After separation of oil and grease from the oily wastewater with said pair of chemicals, the pretreated oily wastewater is processed for soluble metal removal in accordance with the innovative clarification processes (SBS and SBF).

The following are the chemical reactions for treatment of the oily wastewater with both alum and sodium aluminate together as a chemical pair:

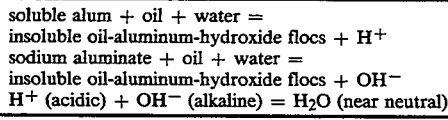

| At pH = about 6.5 |
| --- |
| soluble alum + oil + water = insoluble oil-aluminum-hydroxide flocs + $H^+$ sodium aluminate + oil + water = insoluble oil-aluminum-hydroxide flocs + $OH^-$ $H^+$ (acidic) + $OH^-$ (alkaline) = $H_2O$ (near neutral) |

The emulsified, dissolved and free oils can all be converted into insoluble oil-aluminum-hydroxide flocs by the combinations of alum and sodium aluminate with proper ratio.

The toxic organic bearing wastewater is treated by an enclosed biological sequencing batch reactor (SBR) of this invention.

In summation, the enclosed SBR of this invention is an improved batch biological process using microorganisms (activated sludge) for removal of dissolved and volatile toxic organics in the presence of oxygen, and using gas bubbles for stripping volatile organic compounds (VOCs) from the wastewater into gaseous stream which, in turn, is collected by the enclosure, purified, and recycled for further generation of gas bubbles or discharge. The following is the biochemical and physical-chemical reaction of the enclosed SBR:

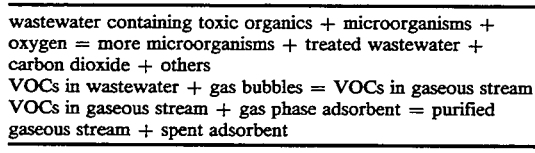

| At pH = 6.5 to 8.5 |
| --- |
| wastewater containing toxic organics + microorganisms + oxygen = more microorganisms + treated wastewater + carbon dioxide + others |
| VOCs in wastewater + gas bubbles = VOCs in gaseous stream |
| VOCs in gaseous stream + gas phase adsorbent = purified gaseous stream + spent adsorbent | where the gas phase granular adsorbent can be granular activated carbon, polymeric resin, or combination thereof, and the oxygen can be supplied by air or pure oxygen. In case the powdered activated carbon (PAC) is dosed to the enclosed SBR, the following is the physical-chemical reaction for toxic organics removal:

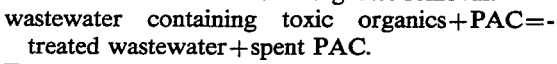

wastewater containing toxic organics+PAC=treated wastewater+spent PAC.

For process operation, the enclosed sequencing batch reactor (SBR) involves separate batch process steps in the sequence of: filling a contaminated liquid, reacting with microorganisms, settling microorganisms and suspended solids, decanting the treated effluent, and wasting settled biological sludges in an enclosed reactor for liquid treatment as well as for air emission control. The sequence of process steps for SBR is described below:

(a) starting a Fill Phase (first step) by introducing said contaminated liquid to a reactor and mixing the said contaminated liquid with the proceeded mixed liquor containing activated sludge, with or without powdered activated carbon (PAC), in the presence of oxygen, (b) stopping Fill Phase (first step) and starting React Phase (second step) by thoroughly aerating the mixed contaminated liquid in said enclosed reactor for air stripping of VOC and biological reduction of all organics from liquid phase, and by collecting & recycling the emitted air stream from the enclosed reactor for air purification, (c) stopping React Phase (second step), and starting Sedimentation Phase (third step) under no inflow, no mixing, and no aeration environment for one hour, to settle the activated sludge and PAC if present, (d) Stopping Sedimentation Phase (third step) and starting Decant Phase (fourth step) for discharge of the treated supernatant without disturbing the settled sludge blanket, (e) stopping Decant Phase (fourth step) and starting Sludge Discharge Phase (fifth step) for discharge of the excessive amount of microorganisms (activated sludge) and spent PAC, (f) entering Idle Phase (sixth step) in the presence of oxygen, when there is more than one reactor or no more treatment is needed, to allow the reactor to remain idle until the reactor is ready for another cycle, and (g) repeating another cycle for liquid treatment.

As much as 95% toxic organic removal from said toxic organic bearing wastewater is observed when the mixed liquor suspended solids (MLSS) or microorganisms are about 2,000–6,000 (5,000) mg/l at room temperature. The improved SBR of this invention is totally covered and is either manually operated or fully automated. Any volatile organic compounds (VOC) emitted from the SBR unit into air is removed by air recirculation and air purification, which is adsorption with polymeric resin, activated alumina, granular activated carbon or combinations thereof. An air source provides the make-up oxygen to SBR for aeration and elimination of volatile organic compounds (VOCs) biochemically and its flow equals to the air effluent from the air purification unit. Powdered activated carbon may be fed to the enclosed SBR unit for removal of toxic organics from wastewater when necessary.

Alternatively the enclosed SBR of this invention can be replaced by activated sludge, trickling filter, rotating biological contactor, lagoon, deep shaft aeration, biological fluidized bed, biofilter, or combinations thereof.

Except said toxic organic bearing wastewater containing toxic organics, all other pre-treated wastewaters (precious metals bearing wastewater, complexed metals bearing wastewater, cyanide bearing wastewater, hexavalent chromium bearing wastewater, and oily wastewater) containing negligible amount of toxic organics can be treated either separately or together by subsequent innovative clarification (SBS and SBF) and polishing (adsorption and SBE).

The innovative clarification of this invention is either Sequencing Batch Sedimentation (SBS) or Sequencing Batch Flotation (SBF).

Technically, the sequencing batch sedimentation (SBS) of this invention involves separate batch process steps in the sequence of filling wastewater, reacting with chemicals and other substances, settling insoluble flocs and biomass, decanting treated effluent, and wasting settled sludges and other substances, for simplified but improved wastewater or groundwater clarification. Specifically, an improved process system for treating a contaminated liquid using the Sequencing Batch Sedimentation (SBS) comprises the following steps in sequence:

(a) selecting a Fill Phase (first step) which is composed of either Static Fill (first step A), or React Fill (first step B),
(b) introducing said contaminated liquid to a reactor under a laminar, non-mixed environment until the reactor is totally filled, if Static Fill (first step A) is chosen,
(c) introducing said contaminated liquid to said reactor with chemical feeders on, under turbulent environment, until the reactor is totally filled, if React Fill (first step B) is chosen,
(d) stopping Fill Phase (first step) and starting React Phase (second step) to treat the contaminated liquid with chemicals,
(e) stopping React Phase (second step) and starting Sedimentation Phase (third step) using gravity force for settling settleable and suspended solids with sufficient settling detention time, and without turbulence,
(f) stopping Sedimentation Phase (third step) and starting Decant Phase (fourth step) for discharge of sedimentation clarified effluent (supernatant) above the reactor bottom, without disturbing the settled sludges,
(g) stopping Decant Phase (fourth step), and starting Sludge Discharge Phase (fifth step) for removal of settled sludges at the reactor bottom,
(h) entering Idle Phase (sixth step) when there is more than one reactor or no more treatment is needed, to allow the reactor to remain idle until the reactor is ready for another cycle, and
(i) repeating another cycle for liquid treatment.

Technically the sequencing batch flotation (SBF) of this invention involves separate batch process steps in the sequence of filling wastewater, reacting with chemicals and other substances, floating lightweight insoluble flocs and biomass, decanting treated effluent, and wasting floated insoluble scums, for simplified but improved wastewater and groundwater clarification. Specifically an improved process system for treating a contaminated liquid using the Sequencing Batch Flotation (SBF) comprises the following steps in sequence:

(a) selecting a Fill Phase (first step) which is composed of either Static Fill (first step A), or React Fill (first step B),
(b) introducing said contaminated liquid to a reactor under a laminar, non-gas bubbled environment until the reactor is totally filled, if Static Fill (first step A) is chosen,
(c) introducing said contaminated liquid to said reactor with chemical feeders on, under turbulent environment, until the reactor is totally filled, if React Fill (first step B) is chosen,
(d) stopping Fill Phase (first step) and starting React Phase (second step) to treat the contaminated liquid with chemicals,
(e) stopping React Phase (second step) and starting Flotation Phase (third step) using fine gas bubbles with diameters less than 80 microns for floating suspended, oily, surface-active and volatile contaminants, with sufficient floating detention time,
(f) stopping Flotation Phase (third step) and starting Decant Phase (fourth step) for discharge of flotation clarified effluent (subnatant) near but above reactor bottom, without disturbing the floated scums on the top,
(g) stopping Decant Phase (fourth step) and starting Sludge Discharge Phase (fifth step) for removal of floated scums in the reactor, as well as settleable matters at the reactor bottom,
(h) entering Idle Phase (sixth step) when there is more than one reactor or more treatment is needed, to allow the reactor to remain idle until the reactor is ready for another cycle, and
(i) repeating another cycle for liquid treatment.

Both SBS and SBF involve the use of multiple batch reactors in pairs, one half of reactors is for processing (flocculation and clarification), and the remaining one half is for sludge-water separation. The two units in each pair are used for processing and sludge-water separation alternately.

The insoluble chemical flocs are settled in SBS units with a cycle time for about 1 hour. The SBS is either manually operated or fully automated.

In case of SBF, the insoluble chemical flocs, however, are floated by fine air bubbles in SBF units with a cycle time of only 5 minutes or less. For SBF clarification, the compressed air is fed to a pressure retention tank at 30–90 psig for air dissolving with less than one minute of detention time. The effluent from the pressure retention tank containing high concentration of dissolved air is released into the SBF unit at one atmospheric pressure for generation of extremely fine air bubbles (less than 80 microns in diameter) for flotation clarification. The SBF is either manually operated or fully automated.

The clarification effluent from either SBS unit or SBF unit is finally polished by ferrous sulfide in Sequencing Batch Exchanger (SBE) and/or by adsorption process, depending on the wastewater characteristics and effluent quality requirements.

The following are the chemical reactions in said SBE:

insoluble ferrous sulfide + soluble $Ni^{+2}$ =
insoluble nickel sulfide + soluble $Fe^{+2}$
insoluble ferrous sulfide + soluble $Zn^{+2}$ =
insoluble zinc sulfide + soluble $Fe^{+2}$
insoluble ferrous sulfide + soluble $Pb^{+2}$ =
insoluble lead sulfide + soluble $Fe^{+2}$
insoluble ferrous sulfide + soluble $Cd^{+2}$ =
insoluble cadmium sulfide + soluble $Fe^{+2}$
insoluble ferrous sulfide + soluble $Cu^{+2}$ =
insoluble copper sulfide + soluble $Fe^{+2}$ -continued

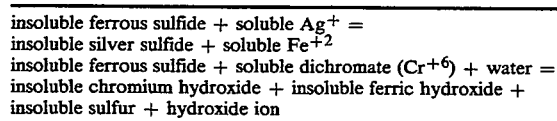

Technically the sequencing batch exchanger (SBE) of this invention involves separate batch process steps in the sequence of: filling wastewater, reacting with ferrous sulfide sludge and other exchangers, settling the sludge and exchange, decanting the treated effluent, and wasting the spent ferrous sulfide and exchanger. Specifically, an improved process system for treating a contaminated liquid using the Sequencing Batch Flotation (SBF) comprises the following steps in sequence:

(a) introducing said contaminated liquid to a reactor containing reusable or freshly prepared exchanger in a Fill Phase (first step), (b) stopping Fill Phase (first step) and starting React Phase (second step) to treat the contaminated liquid by exchanging soluble metal ions in said contaminated liquid with iron in insoluble exchanger under a mixing, turbulent environment, (c) stopping React Phase (second step) and starting Separation Phase (third step) using gravity force for settling reusable exchanger sludges and other spent exchanger sludges, without turbulence, (d) stopping Separation Phase (third step) and starting Decant Phase (fourth step) for discharge of exchanger purified effluent (supernatant) well above the reactor bottom, without disturbing the settled sludges, (e) deciding next phase based on the reactor's effluent quality or predetermined process operational hours, (f) if exchanger sludges are spent, not reusable, and must be discarded, stopping Decant Phase (fourth step), and entering New Exchanger Phase (fifth step) for removal of all settled spent sludges at the reactor bottom, and addition of freshly prepared exchanger, (g) if exchanger sludges are not totally spent, and still reusable, stopping Decant Phase (fourth step), and entering Idle Phase (sixth step) when there is more than one reactor or no more treatment is needed, to allow the reactor to remain idle until the reactor is ready for another cycle, and (h) repeating another cycle for liquid treatment.

The SBE process of this invention involves the use of insoluble exchanger, such as ferrous sulfide in a Sequencing Batch Exchanger (SBE) reactor where residual soluble metals (divalent zinc, nickel, cadmium, lead, silver and copper ions) react with ferrous sulfide and form insoluble zinc sulfide, nickel sulfide, cadmium sulfide, lead sulfide, silver sulfide and copper sulfide. The insoluble ferrous in ferrous sulfide is replaced by the target heavy metal ions, and becomes soluble divalent ferrous ion. At pH 9.5, the residual concentrations of zinc sulfide, nickel sulfide, cadmium sulfide, lead sulfide, silver sulfide and copper sulfide are observed to be each below 1 microgram per liter. Another exchanger used in SBE of this invention is ion exchange resin. SBE is either manually operated or fully automated. SBE can be replaced by either modular ion exchange or conventional ion exchange.

Alternatively, the SBS or SBF effluent is processed by peat adsorption of this invention in which peat is used as the adsorbent for adsorption of contaminants from wastewater. Peat moss is a complex insoluble material with lignin and cellulose as major constituents. These constituents, particularly lignin, bear polar functional groups, such as alcohols, aldehydes, ketones, acids, phenolic hydroxides and ethers that can be involved in chemical bonding with soluble metal contaminants. In operation of peat adsorption, the pretreated effluent is pumped into a large chamber (a kier) which contains a layer of peat through which the waste stream passes. The wastewater flows to a second kier for further adsorption reaction. It is observed that because of the polar nature of peat, its adsorption of dissolved solids is extremely high. Granular activated carbon, polymeric synthetic adsorbents are used to enhance or replace peat for adsorption of contaminants from wastewater.

Peat adsorption is mainly used in metal finishing plants for removal of residual dissolved metals from clarifier effluent. Specifically peat moss is used to treat wastewaters containing heavy metals such as mercury, cadmium, zinc, copper, iron, nickel, chromium, and lead, as well as organic matter such as oil, detergents, and dyes. The following are the physical-chemical reactions of peat adsorption:

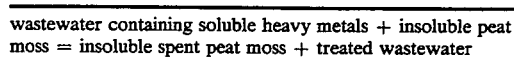

where the treated wastewater contains very low and negligible concentrations of heavy metals, and the insoluble spent peat moss is the toxic sludge required final disposal. In addition, the complexed metal wastes, as well as the complexing agents themselves, are removed by contact with peat moss. Therefore, peat adsorption can be applied to any metal finishing operation which uses complexing agents extensively.

The effluent or wastewater from each treatment train, or the combined effluent is buffered/neutralized by a buffering/neutralizing filter containing neutralizing agent which is selected from the group comprising calcite, Corosex, magnesium oxide, calcined dolomite, Megabeads, or combination thereof.

In operation, the acidic wastewater is fed to the neutralizing filter by pumping or gravity. The filter effluent is the buffered/neutralized wastewater. The neutralizing filter of this invention includes the following physical-chemical reaction:

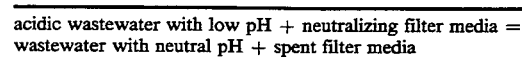

where the neutralizing filter media are granular neutralizing agent(s).

The metal bearing waste sludges, toxic organics bearing waste sludges and spent adsorbents generated from the wastewater treatment processes and residual ashes (including PCB residuals) from the incinerators, combustion chambers, thermal reactors of the metal finishing operations are solidified by a solidification process using cement or polymer solidifying agent. The toxic heavy metals, PCB and other toxic organics are not leached out from the solidified stable end products, which are either bricks or blocks.

The metal bearing sludges include, but are not limited to the following insoluble substances produced from the process system of this invention: chromium hydroxide, cadmium hydroxide, copper hydroxide, lead hydroxide, nickel hydroxide, silver hydroxide, zinc hydroxide, calcium hydrogen phosphite, calcium sulfate, calcium phosphate, aluminum phosphate, oil-aluminum-hydroxide, spent PAC, spent adsorbents, nickel sulfide, zinc sulfide, lead sulfide, cadmium sulfide, copper sulfide, silver sulfide, chromium sulfide, aluminum hydroxide, ferric hydroxide, spent peat moss, spent filter media. The following are the physical-chemical reactions of the solidification processes:

cementation metal bearing sludges + cement + sands = cement block or brick polymer solidification metal bearing sludges + polymeric solidifying agent + fillers = blocks or bricks solidified by polymer where both cement and polymeric solidifying agent are commercially available, and the fillers can be cement, bentonite clay, small granular substances, or combinations thereof.

In accordance with the present invention, an improved apparatus shown in FIG. 1 for liquid treatment (including metal finishing effluent treatment and groundwater decontamination) and gas purification and emission control comprises the following:

(a) an inlet pipe 1P leading a contaminated liquid 1 to a reactor 2 of said apparatus, (b) said reactor 2 having the side walls, the top enclosure 16 and the bottom thereof as an outside wall of said apparatus, (c) a chemical feeder means 12 connected to said inlet pipe 1P and said reactor 2 for feeding chemicals, microorganisms, exchangers, or powdered activated carbon (PAC), slurry to said contaminated liquid 1, (d) mixing means 17 inside said reactor 2 or mixing means 9 & 17B connected to said reactor 2 for mixing the contaminated liquid 3 with chemicals, microorganisms, PACs, or exchangers during reaction, (e) coarse bubbles distribution means 4D inside as well as connected to said reactor 2 for generating coarse gas bubbles 4B (with diameter greater than 80 microns) for biological liquid treatment in the presence of microorganisms and a soluble gas required by said microorganisms, and for physical gas stripping of volatile organic compounds (VOCs) and volatile inorganic compounds (VICs) from said contaminated liquid 3 inside said reactor 2, (f) fine bubbles distribution means 4DF inside as well as connected to said reactor 2 for generating extremely fine gas bubbles (with diameter smaller than 80 microns) for dissolved gas flotation of suspended substances (including microorganisms, chemical flocs, oil, particulates, etc) to the liquid surface inside said reactor 2, (g) gas moving means 11 with gas pipe 11P and flow meter, connected to the top enclosure 16 of said reactor 2 for measuring, collecting, and moving the emitted gas stream 5 from the top of said reactor 2 to a gas purification means 6, then to the bottom of said reactor 2, completing a cycle, (h) said gas purification means 6 with built-in gas compressing and gas dissolving capability, connected to said gas moving means 11 for purifying the emitted gas stream 5, and preparing the purified gas stream for recirculation to said reactor 2, through either mixing means 17 or coarse bubble distribution means 4D, (i) liquid discharge means 9 connected to said reactor 2 for discharging the treated reactor effluent 13, and (j) sludge discharge means 10 connected to said reactor for discharging the sludges 8, spent exchangers, etc. from said reactor 2.

The same improved sequencing batch liquid treatment apparatus can be operated in different operational modes depending upon the wastewater characteristics: (a) enclosed sequencing batch reactor (FIG. 1), (b) sequencing batch sedimentation (FIG. 2), (c) sequencing batch flotation (FIG. 3), (d) sequencing batch exchange (FIG. 4), or combinations thereof, which are described below.

FIG. 1 to FIG. 5 inclusive are a set of flow diagrams of the present invention when applied to separate or combined wastewater treatment.

FIG. 1 presents the flow diagrams of Sequencing Batch Reactor (SBR) process system which comprises the following steps in sequence: Fill Phase 101, React Phase 102, Sedimentation Phase 103, Decant Phase 104, Sludge Discharge Phase 105, and Idle Phase 106, according to the present invention. During the Fill Phase 101, the influent flow 1 is introduced to the SBR enclosed reactor 2 through an inlet pipe 1P, and said influent flow 1 is mixed with the proceeded mixed liquor 3 containing activated sludge, with or without powdered activated carbon 12, in the presence of oxygen from air 4. After said Fill Phase 101 is over, it is stopped, and React Phase 102 is started by thoroughly aerating the mixed wastewater 3 in said enclosed reactor 2 for air stripping of volatile organic compounds (VOC) as well as biological reduction of organics from the mixed liquor 3, and by collecting the emitted air stream 5 from said enclosed reactor 2 for air purification 6, and recycling the purified air 4R to said enclosed reactor 2 for reuse. React Phase 102, is stopped when it is over, and Sedimentation Phase 103 is started under no inflow, no mixing and no aeration environment for one hour, to settle the activated sludge 7 and powdered activated carbon (PAC) if present, and to produce the supernatant 15 in said enclosed reactor 2. Sedimentation Phase 103 is stopped when it is over, and Decant Phase 104 is started for discharge of the treated supernatant 15 by gravity or a pump 9 without disturbing the settled sludge blanket 8. Decant Phase 104 is stopped when it is over, and Sludge Discharge Phase 105 is started for discharge of the excessive amount of activated sludge and spent PAC 8E, by a pump 10. Sludge Discharge Phase 105 is stopped when it is over, and Idle Phase 106 is started in the presence of oxygen from air 4, when there is more than one reactor 2 or no more treatment is needed, to allow the reactor 2 to remain idle until the reactor 2 is ready for another cycle. Repeating another cycle beginning Fill Phase 101 for wastewater treatment again.

FIG. 2 presents the flow diagrams of Sequencing Batch Sedimentation (SBS) process system which comprises the following steps in sequence: Fill Phase (Static Fill 201 or React Fill 202), React Phase 203, Sedimentation Phase 204, Decant Phase 205, Sludge Discharge Phase 206 and Idle Phase 207 in accordance with the present invention. To operate the SBS process system, a Fill Phase which is composed of Static Fill 201 or React Fill 202, is selected. The influent flow 21 is then introduced to the reactor 22 of said process system under a non-mixed environment until the reactor 22 is totally filled, if Static Fill 201 is chosen. Or the influent flow 21 is introduced to said process system with chemical feeder 32 on, under turbulent environment, until the reactor 22 is totally filled, if React Fill 202 is chosen. The Fill Phase (either Static Fill 201 or React Fill 202) is stopped when it is over, and React Phase 203 is started to treat the wastewater 23 with chemicals from chemical feeder 32. React Phase 203 is stopped when it is over, and Sedimentation Phase 204 is started using gravity force for settling settleable and suspended solids 27 with sufficient settling detention time, and without turbulence. Sedimentation Phase 204 is stopped when it is over, and Decant Phase 205 is started for discharge of sedimentation clarified effluent 35 (supernatant) above the reactor bottom, without disturbing the settled sludges 28. Decant Phase 205 is stopped when it is over, and Sludge Discharge Phase 206 is started for removal of settled sludges 28 at the bottom of the reactor 22. Sludge Discharge Phase 206 is stopped, and Idle Phase 207 is started when there is more than one reactor 22 or no more treatment is needed, to allow the reactor 22 to remain idle until the reactor 22 is ready for another cycle. Another cycle starting from Fill Phase-Static Fill 201 or Fill Phase-React Fill 202 again for treatment of said influent flow 21.

Figure 3:
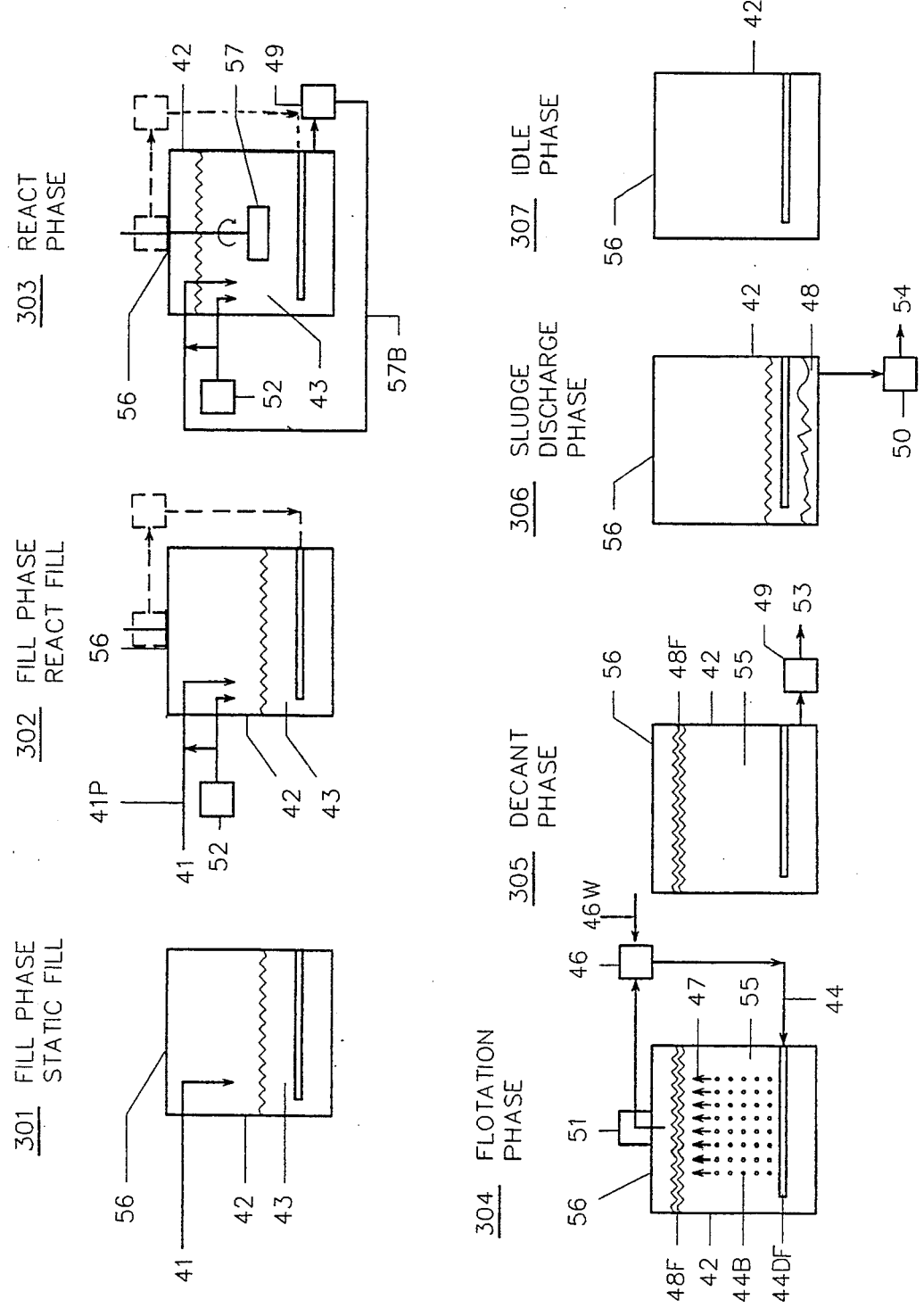
FIG. 3 presents the flow diagrams of Sequencing Batch Flotation (SBF) operational mode which comprises the following steps in sequence: Fill Phase (Static Fill or React Fill), React Phase, Flotation Phase, Decant Phase, Sludge Discharge Phase, and Idle Phase, in accordance with the present invention.

FIG. 3 presents the flow diagrams of Sequencing Batch Flotation (SBF) process system which comprises the following steps in sequence: Fill Phase (Static Fill 301 or React Fill 302), React Phase 303, Flotation Phase 304, Decant Phase 305, Sludge Discharge Phase 306, and Idle Phase 307, in accordance with the present invention. To operate said SBF process system, a Fill Phase which is composed of Static Fill 301, or React Fill 302 is selected. The influent flow 41 is introduced to the reactor 42 of said process system under an environment without gas bubbling until the reactor 42 is totally filled, if Static Fill 301 is chosen. Or the influent flow 41 is introduced to the reactor 42 of said process system with chemical feeder 52 on under turbulent environment, until the reactor 42 is totally filled, if React Fill 302 is chosen. The Fill Phase (either Static Fill 301 or React Fill 302) is stopped when it is over, and React Phase 303 is started to treat the wastewater 43 with chemicals from said chemical feeder 52. The React Phase 303 is stopped when it is over and Flotation Phase 304 is started using fine gas bubbles 44B with diameters less than 80 microns for floating suspended, oily, surface-active and volatile contaminants 47, with sufficient floating detention time. Flotation Phase 304 is stopped when it is over and Decant Phase 305 is started for discharge of flotation clarified effluent 55 (subnatant) near but above the bottom of said reactor 42, without disturbing the floated scums 48F on the top. Decant Phase 305 is stopped when it is over and Sludge Discharge Phase 306 is started for removal of floated scums 48F in the reactor 42, as well as settleable matters 48 at the bottom of said reactor 42. Sludge Discharge Phase 306 is ended when it is over, and Idle Phase 307 is started when there is more than one reactor 42 or more treatment is needed, to allow the reactor 42 to remain idle until the reactor 42 is ready for another cycle. Another cycle is repeated for wastewater treatment, starting either Fill Phase-Static Fill 301, or Fill Phase-React Fill 302, again.

Figure 4:
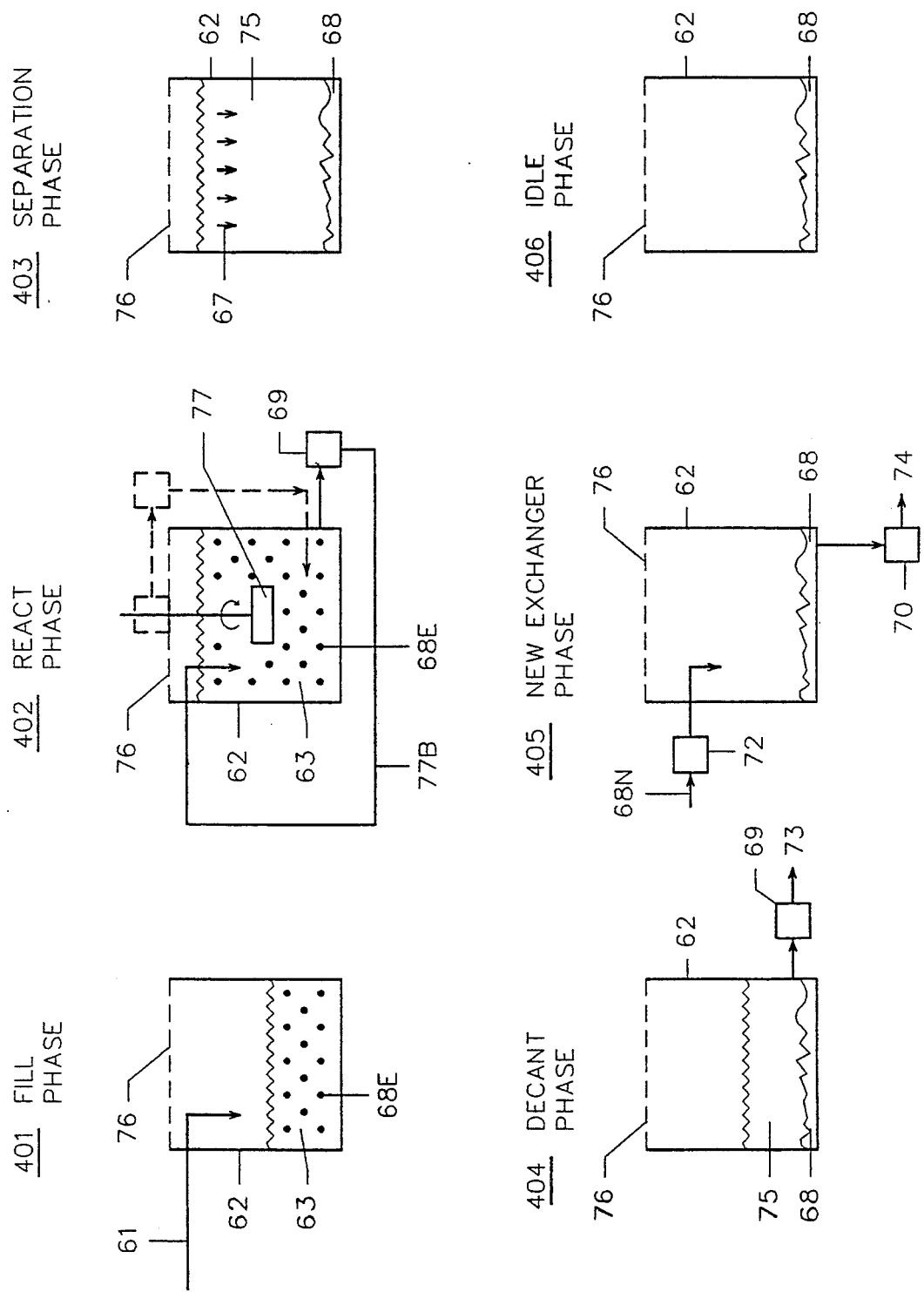
FIG. 4 presents the flow diagrams of Sequencing Batch Exchanger (SBE) operational mode which comprises the following steps in sequence: Fill Phase, React Phase, Separation Phase, Decant Phase, New Exchanger Phase and Idle Phase, according to the present invention.

FIG. 4 presents the flow diagrams of Sequencing Batch Exchanger (SBE) process system which comprises the following steps in sequence: Fill Phase 401, React Phase 402, Separation Phase 403, Decant Phase 404, New Exchanger Phase 405 and Idle Phase 406, according to the present invention. To operate the SBE process system, the influent flow 61 is introduced to the reactor 62 of said process system containing reusable or freshly prepared exchanger 68E in a Fill Phase 401. Fill Phase 401 is stopped when it is over and React Phase 402 is started to treat the wastewater 63 by exchanging soluble metal ions in wastewater 63 with iron in insoluble exchanger 68E under a mixing 77, turbulent environment. React Phase 402 is stopped when it is over and Separation Phase 403 is started using gravity force for settling reusable exchanger sludges and other spent exchanger sludges 67, without turbulence. Separation Phase 403 is stopped when it is over, and Decant Phase 404 is started for discharge ion exchanger purified effluent 75 (supernatant) well above the bottom of said reactor 62, without disturbing the settled sludges 68. Next phase is decided based on the quality of SBE's effluent 73 or predetermined SBE operational hours. If exchanger sludges 68 are spent, not reusable, and must be discarded, Decant Phase 404 is stopped, and New Exchanger Phase 405 begins for removal of all settled spent sludges at the bottom of reactor 62, and for addition of freshly prepared exchanger 68N with chemical feeder 72. If exchanger sludges 68 are not totally spent, and still reusable, Decant Phase 404 is stopped and Idle Phase 406 begins when there is more than one reactor 62 or no more treatment is needed, to allow the reactor 62 to remain idle until the reactor 62 is ready for another cycle. Another cycle is repeated for treatment of said influent flow 61 starting Fill Phase 401.

FIG. 5 show the overall flow diagram of an improved process system for treatment of the precious metals bearing wastewater 81, the chromium bearing wastewater 82, the common metal bearing wastewater 83, the cyanide bearing wastewater 84, the complexed metal bearing wastewater 85, the oily wastewater 86, the toxic organic bearing wastewater 87 and the solid wastes from various metal finishing operations, using SBR (FIG. 1), SBS (FIG. 2), SBF (FIG. 3), SBE (FIG. 4) and other supplemental unit processes, according to the present invention. In operation, the precious metal bearing wastewater 81, the chromium bearing wastewater 82, the common metal bearing wastewater 83, the cyanide bearing wastewater 84, the complexed metal bearing wastewater 85, the oil wastewater 86 and the toxic organic bearing wastewater 87, are collected separately for separate treatment in steps a, b, c, d, e, f and i, respectively, described below. Precious metals are removed from said precious metal bearing wastewater 81 by immersing iron in said precious metal bearing wastewater 81 (step a 88). Hexavalent chromium ions in said chromium bearing wastewater 82 are converted into trivalent chromium ions at optimum pH in acid range with a reducing agent (step b 89). Soluble trivalent chromium, soluble common metals (lead, copper, zinc, tin, nickel, mercury, and silver) and soluble phosphite in said common metal bearing wastewater 83 are converted into insoluble forms with a precipitating agent at optimum pH in alkaline range (step c 90). Sulfite, phosphite and cyanide in the cyanide bearing wastewater 84 are oxidized at optimum pH with an oxidant (step d 91).

Soluble metals and soluble complexing agents are removed from said complexed metal bearing wastewater 85 with a precipitating agent and an adsorbent (step e 92). Surfactants, oil and grease are removed from said oily wastewater 86 with a chemical pair (step f 93). Insoluble contaminants are removed from each pretreated waste stream or the combined waste above from steps a to f inclusive by Sequencing Batch Sedimentation (SBS) which comprises the steps shown in FIG. 2 in sequence (step g-1 94) or by Sequencing Batch Flotation (SBF) which comprises the steps shown in FIG. 3 in sequence (step g-2 95). The SBS effluent 94E or SBF effluent 95E above are further treated using peat or an exchanger in a Sequencing Batch Exchanger (SBE) reactor which comprises the steps shown in FIG. 4 in sequence (step h 96). The toxic organics from said toxic organic bearing wastewater 87 are removed by the enclosed biological Sequencing Batch Reactor (SBR), which is equipped with air recirculation, air purification, and a make-up air source and comprises the steps shown in FIG. 1 in sequence (step i 97). The individual effluent or the combined effluent 96E & 97E are buffered and neutralized using buffering/neutralizing filter media (step j 99), and then the buffered/neutralized effluent 99E is discharged. All metal bearing waste sludges 94S, 95S & 96S, toxic organics bearing sludges 97S, spent adsorbents 97S, incinerator ashes and PCB residuals, from all metal finishing operations are solidified using cement or polymer solidifying agent (step k 98).

The same apparatus of this invention can be operated in various operational modes: (a) enclosed sequencing batch reactor, (b) sequencing batch flotation, (c) sequencing batch sedimentation, (d) sequencing batch exchange, and the combinations thereof. For instance, the operation can be a combination of said enclosed sequencing batch reactor and said sequencing batch flotation (SBR-SBF) when using the same apparatus disclosed in the Summary of the Invention. The combined SBR-SBF operational mode is also termed Sequencing Batch Biological Flotation (SBBF) specifically as follows:

101 Fill Phase,
102 React Phase,
304 Flotation Phase,
305 Decant Phase,
105 Sludge Discharge Phase, and
106 Idle Phase, in which the coarse bubbles distribution means 4D (FIG. 1) is used for biological reactions and gas stripping during React Phase 102 (FIG. 1), the Sedimentation Phase 103 and the Decant Phase 104 (FIG. 1) are replaced by the Flotation Phase 304 and Decant Phase 305 (both in FIG. 3), respectively, in which the fine bubbles distribution means 44DF (FIG. 3) is used for Flotation Phase 304.

EXAMPLE I

Actual field data from sampling at a metal finishing operation clearly showed the effectiveness of SBE in FIG. 4 using fresh ferrous sulfide as the exchanger on removal of soluble hexavalent chromium (influent concentration=12 mg/l) as well as soluble total chromium (influent concentration=20 mg/l). After SBE treatment, the hexavalent chromium as well as total chromium in the effluent became undetectable.

EXAMPLE II

Actual experimental data from sampling at a pilot plant operation showed that the treatment efficiencies of: (a) SBS and peat adsorption, and (b) SBF and peat adsorption, were equally excellent:

| Contaminants | Influent Conc. (mg/l) | Effluent Conc. (mg/l) |
|---|---|---|
| Soluble Lead | 18 | 0.02 |
| Soluble Copper | 200 | 0.2 |
| Soluble Chromium (+6) | 30,000 | 0.02 |
| Oil and Grease | 10 | 0.5 |
| Cyanide | 32 | 0.5 |
| Zinc | 21 | 0.02 |

The above experiment was illustrated by FIG. 5, in which the step b (pH=2.5 using sodium thiosulfate), step c (pH=9.1 using lime), step d (pH=9.1 using peroxide), step e (using lime), step f (using alum-sodium aluminate), step g-1 for SBS or step g-2 for SBF, step h (peat adsorption) and step j (using calcite and Corosex). Since toxic organics concentration and precious metals concentration were both low in the influent wastewater, step i and step a shown in FIG. 5 were not required. Both the waste sludge 94S from the SBS experiment (step g-1) and the waste sludge 95S from the SBF experiment (step g-2) were collected and successfully solidified by cementation (step k using cement).

EXAMPLE III

Actual experimental data from sampling at a pilot plant operation showed that the treatment efficiencies of: (a) enclosed SBR shown in FIG. 1, and (b) enclosed SBR and SBF combined operational mode SBBF, were equally excellent:

| Contaminants | Influent Conc. (mg/l) | Effluent Conc. (mg/l) |
|---|---|---|
| BOD | 212 | <10 |
| TSS | 68 | <5 |
| Phenol | 5 | <0.5 |
| Methylene Chloride | 0.046 | <0.001 |
| Toluene | 0.028 | <0.001 |
| Trichloroethylene | 0.063 | <0.001 |

The mixed liquor suspended solids (MLSS, or microorganisms concentration), liquid temperature, and pH were 5100 mg/l, 24° C., and 6.8, respectively. The detention time of React Phase 102 (FIG. 1) for SBR was 220 minutes. The detention time of Sedimentation Phase 103 for SBR operational mode was 60 minutes. The detention time of Flotation Phase 304 (FIG. 3) for a combined SBR-SBF operation was 3.5 minutes. Accordingly, the same improved apparatus when operated in either SBR mode or combined SBR-SBF mode (i.e. SBBF mode) will give similar treatment results; however, the required detention time for the combined SBR-SBF mode will always be shorter. The toxic organic compounds, methylene chloride, toluene and trichloroethylene were also effectively removed. In either SBR or SBR-SBF operational mode, the emitted air effluent 5 from the reactor 2 (FIG. 1) was collected, purified, and recycled to said reactor 2 in said React Phase 102.

While particular embodiments of the invention have been described herein, the modifications and variations thereof will occur to those skilled in the art. It is to be understood, therefore, that the appended claims are intended to cover such modifications and variations which are within the scope and spirit of this invention.

The enclosed sequencing batch reactor (SBR) normally adopts aerobic and facultative microorganisms in the presence of air or oxygen for aerobic biological oxidation of organic pollutants in a contaminated liquid.

For anaerobic biological treatment, the enclosed sequencing batch reactor of this invention adopts anaerobic and facultative microorganisms in the absence dissolved oxygen in said contaminated liquid, and as an option the coarse bubbles distribution means 4D generates coarse nitrogen bubbles instead of coarse air or oxygen bubbles during the React Phase 102 (FIG. 1).

The reactor of sequencing batch flotation (SBF) normally adopts air for generation of fine air bubbles through a fine bubbles distribution means 44D during the Flotation Phase 304 (FIG. 3). For special sequencing batch flotation applications, the gases other than air (such as nitrogen, carbon dioxide, ozone, chlorine, sulfur dioxide, oxygen, or combinations thereof) are adopted for generation of fine gas bubbles. As a typical example, for anaerobic biological treatment using the combined SBR-SBF operational mode (or simply SBBF mode), nitrogen gas is used for generation of coarse nitrogen bubbles during the React Phase 102 (FIG. 1) and generation of fine nitrogen bubbles during the Flotation Phase 304 (FIG. 3). Technically speaking, the gas bubbles with diameter greater than 80 microns are coarse bubbles, and the gas bubbles with diameter smaller than 80 microns are fine bubbles.

Normally, the coarse gas bubbles are produced through the coarse bubble distribution means 4D during the Fill Phase 101, React Phase 102 and Idle Phase 106 operating in said sequencing batch reactor (FIG. 1). Alternatively, the coarse gas bubbles can be generated by the shearing force of said mechanical mixing means 17 in which the shaft is hollow allowing the compressed gas to enter.

Referring to FIG. 1, the coarse bubbles distribution means 4D of said apparatus of this invention is normally powered by the gas moving means 11 (FIG. 1), but can be additionally powered by the gas purification means 6 that has a built-in gas compressing unit 6G for transporting and recycling the purified gas 4R to the reactor 2 through the coarse bubbles distribution means 4D.

Alternatively coarse bubbles generation inside said reactor 2 (FIG. 1) can be enhanced by floating mechanical aerators and/or vertical coarse bubbles distribution means which are commercially available.

The apparatus of this invention is operated in one of operational modes: said enclosed sequencing batch reactor (FIG. 1), said sequencing batch sedimentation (FIG. 2), said sequencing batch flotation (FIG. 3), said sequencing batch exchanger (FIG. 4), or combinations thereof (such as said sequencing batch biological flotation). In each operational mode during said react fill, said react phase or said flotation phase, the emitted gas stream from said enclosed reactor is collected by said gas moving means and purified and recycled by said gas purification means. Accordingly, the apparatus shown in FIGS. 1-4 is identical, but simply operated in different modes.

The gas purification means 6 (FIG. 1) of said apparatus of this invention consists of: an adsorption unit 6A packed with granular activated carbon, polymeric resins, alumina, peat, cloth type filter media, sponge type filter media, or combinations thereof; a gas compressing unit 6G; and a gas dissolving unit 6D which is disclosed in the U.S. Pat. No. 5,049,320, issued to Wang et al, on Sep. 17, 1991.

For coarse bubble generation shown in React 102 of FIG. 1, the emitted gas 5 inside said reactor 2 is collected by the gas moving means 11, purified by the adsorption unit 6A of said gas purification means 6, and returned to said reactor 2 through said coarse bubbles distribution means 4D normally, or through said mechanical mixing means 17 alternatively. The gas compressing unit 6G of said gas purification is needed as a second power source for coarse bubbles generation upon demand.

The gas compressing unit 6G, the gas dissolving unit 6D of said gas purification means 6, and a water source 6W are required for fine bubbles generation in accordance with the details disclosed in the U.S. Pat. No. 5,049,320.

What is claimed is:

1. A manually or automatically operated sequencing batch apparatus for liquid treatment and air pollution control comprising the following means:
   (a) an inlet pipe leading a contaminated liquid to an enclosed reactor of said apparatus;
   (b) said reactor connected to said inlet pipe and having vertical side walls, a removable enclosure and a bottom thereof as an outside wall of said apparatus;
   (c) a chemical feeder means connected to said inlet pipe and said reactor for feeding chemicals, microorganisms, exchangers, powdered activated carbon slurry or combinations thereof to said contaminated liquid; said exchangers further comprising ferrous sulfide, or ion exchange resin, or both;
   (d) mechanical mixing means inside said reactor and/or recirculating mixing means connected to said reactor for mixing the contaminated liquid with chemicals, microorganisms, powdered activated carbons, exchangers or combinations thereof inside said reactor;
   (e) coarse bubbles distribution means positioned inside said reactor for generating coarse gas bubbles with diameter greater than 80 microns for biological liquid treatment in the presence of microorganisms and soluble gas required by said microorganisms, and/or for physical gas stripping of volatile organic compounds and volatile inorganic compounds from said contaminated liquid inside said reactor;
   (f) fine bubbles distribution means positioned inside said reactor for generating extremely fine gas bubbles with diameter smaller than 80 microns for floating suspended substances including microorganisms, chemical flocs, oil, particulates, or combinations thereof to the liquid surface inside said reactor, thereby producing a treated reactor effluent, a gas stream, and a sludge; said sludge further comprising microorganisms, spent exchangers, spent powdered activated carbons, contaminants, or combinations thereof;
   (g) gas moving means with gas pipe and flow meter, connected to the enclosure on the top of said reactor for measuring, collecting, and moving the gas stream from the top of said reactor to a gas purification means, then to said reactor, completing a cycle,
   (h) said gas purification means connected to said gas moving means and comprising a built-in adsorption unit, a built-in gas compressing unit, and a built-in gas dissolving unit, for purifying the gas stream, as well as for recycling a purified gas stream to said reactor, (i) liquid discharge means connected to said reactor for discharging the treated reactor effluent, and (j) sludge discharge means connected to said reactor for discharging the sludge from said reactor.

2. A manually or automatically operated sequencing batch apparatus for liquid treatment comprising the following means:

(a) an inlet pipe leading a contaminated liquid to a reactor of said apparatus;

(b) said reactor connected to said inlet pipe and having vertical side walls, and a bottom thereof as an outside wall of said apparatus;

(c) a chemical feeder means connected to said inlet pipe and said reactor for feeding chemicals, microorganisms, exchangers, powdered activated carbon slurry or combinations thereof to said contaminated liquid; said exchangers further comprising ferrous sulfide, or ion exchange resin, or both;

(d) mechanical mixing means inside said reactor and/or recirculating mixing means connected to said reactor for mixing the contaminated liquid with chemicals, microorganisms, powdered activated carbons, exchangers or combinations thereof inside said reactor;

(e) coarse bubbles distribution means positioned inside said reactor for generating coarse gas bubbles with diameter greater than 80 microns for biological liquid treatment in the presence of microorganisms and soluble gas required by said microorganisms, and/or for physical gas stripping of volatile organic compounds and volatile inorganic compounds from said contaminated liquid inside said reactor;

(f) fine bubbles distribution means positioned inside said reactor for generating extremely fine gas bubbles with diameter smaller than 80 microns for floating suspended substances including microorganisms, chemical flocs, oil, particulates, or combinations thereof to a wastewater surface inside said reactor, thereby producing a treated reactor effluent, a gas stream, and a sludge; said sludge further comprising microorganisms, spent exchangers, spent powdered activated carbons, contaminants, or combinations thereof;

(g) liquid discharge means connected to said reactor for discharging the treated reactor effluent, and (h) sludge discharge means connected to said reactor for discharging the sludge from said reactor.

* * * * *